United States Patent
Chen et al.

(10) Patent No.: US 7,257,806 B1
(45) Date of Patent: Aug. 14, 2007

(54) SYSTEM AND METHOD FOR EFFICIENTLY PASSING INFORMATION BETWEEN COMPILER AND POST-COMPILE-TIME SOFTWARE

(75) Inventors: Ding-Kai Chen, San Jose, CA (US); Dz-Ching Ju, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/422,539

(22) Filed: Oct. 21, 1999

(51) Int. Cl.
*G06F 9/45* (2006.01)

(52) U.S. Cl. .................. 717/141; 717/153; 717/154

(58) Field of Classification Search .............. 717/9, 717/5, 7, 8, 121–161
See application file for complete search history.

(56) References Cited

U.S. PATENT DOCUMENTS

| | | | | |
|---|---|---|---|---|
| 4,667,290 A | * | 5/1987 | Goss et al. ............... | 717/147 |
| 5,367,684 A | * | 11/1994 | Smith ..................... | 717/140 |
| 5,828,886 A | * | 10/1998 | Hayashi .................. | 717/9 |
| 5,857,103 A | * | 1/1999 | Grove ..................... | 717/158 |
| 6,026,241 A | * | 2/2000 | Chow et al. .............. | 717/9 |
| 6,128,775 A | * | 10/2000 | Chow et al. .............. | 717/9 |
| 6,289,505 B1 | * | 9/2001 | Goebel ................... | 717/9 |
| 6,314,510 B1 | * | 11/2001 | Saulsbury et al. ......... | 712/213 |
| 6,317,869 B1 | * | 11/2001 | Adl-Tabatabai et al. ..... | 717/132 |
| 6,397,379 B1 | * | 5/2002 | Yates et al. .............. | 717/140 |

* cited by examiner

Primary Examiner—Chuck Kendall (57) ABSTRACT

System and method are described for register optimization during code translation utilizes a technique that removes the time overhead for analyzing register usage and eliminates fixed restraints on the compiler register usage. The present invention for register optimization utilizes a compiler to produce a register usage bit vector in a NOP instruction within each basic block (i.e., subroutine, function, and/or procedure). Each bit in the bit vector represents a particular caller-saved register. A bit is set if, at the location of NOP instruction, the compiler uses the corresponding register within that basic block containing the NOP instruction to hold information to be used at a later time. During the translation, the translator examines the register usage bit vector to very quickly determine which registers are free and therefore can be used during the register optimization without the need to save and restore the register values.

5 Claims, 9 Drawing Sheets

SYSTEM AND METHOD FOR EFFICIENTLY PASSING INFORMATION BETWEEN COMPILER AND POST-COMPILE-TIME SOFTWARE

BACKGROUND OF THE INVENTION

1. Field of the Invention

The present invention is generally related to program optimization, and more particularly related to an apparatus and method for efficiently passing compiler information to post-compile-time software.

2. Description of Related Art

As is known in the computer and software arts, when a software program is developed it will be optimized to run on a particular computer architecture. While it is possible that the software program developed for an original computer architecture will run on a computer system with a new or different architecture, the execution of the software program optimized for an old computer architecture will not generally run as quickly on a computer system with a new architecture, if at all. Therefore, devising a way to run an existing (i.e. old) architecture binary version of a computer program on a new architecture or improve the performance of the computer program on the existing architecture, is an important procedure. One such way to improve the performance of a computer program is to utilize a post-compile-time dynamic optimizer.

When software tools such as dynamic optimizer or profiling tools work on the binaries produced by the compiler, they face the challenge of analyzing low-level programs. It is desirable that some information can be passed from the compiler to the dynamic optimizer to make the analysis easier and more efficient.

A good example is that when a dynamic optimizer generates code at run-time, it often needs to perform register liveness analysis of the binary code in order to find unused registers that can be used without altering the program behavior. Liveness of a register occurs when the register contains data that is to be utilized in subsequent processing. A register can switch between active usage of storing a value for later consumption (live), and an inactive state (dead). Since the compiler has already performed a liveness analysis, reusing this liveness information is just a matter of how to pass the information to the dynamic optimizer efficiently.

Heretofore, software developers have lacked an apparatus and method for passing compile time information at run time to post-compile-time software in an efficient way.

SUMMARY OF THE INVENTION

To achieve the advantages and novel features, the present invention is generally directed to a system and method for efficiently passing compiler information at run time to hardware or software in an efficient way. The present invention is particularly useful for efficiently passing compiler information during code optimization or translation utilizing free or unused operand fields of instructions such as NOP, and encoding the compile time information in the unused operand field. This technique removes the time overhead for analyzing binaries or low-level programs and does not increase program code size.

The present invention provides a system and method for passing compile time information between a compiler and real-time operation of post-compile-time software. Briefly described, in architecture, the system can be implemented as follows. The preferred system of the present invention utilizes an unused NOP operand (a register usage bit vector) that is a vehicle (or communication channel) between a static compiler and a dynamic optimizer. Each bit in the vector represents a particular register and is used to indicate if the register may be live. The register usage bit vector in the unused NOP operand is used to make finding free registers easier during optimization.

The present invention can also be viewed as providing a method for passing compile time information between a compiler and real-time operation of post-compile-time software. In this regard, the method can be broadly summarized by the following steps: the compiler produces bit vectors for each basic block, (i.e., subroutine, function, and/or procedure) and places the bit vector in the unused portion of the NOP instruction encoding. A bit in the vector represents a particular register. A bit is set if the register may be live at the location of the NOP instruction and allows the dynamic optimizer to determine if further analysis of the low-level code to determine whether the register is truly live is required. On the other hand, a zero (i.e., unset) bit in the bit vector signals that the compiler does not use the corresponding register (i.e., is a dead register) at the location of the NOP instruction, and therefore the register can be used by the dynamic optimizer.

NOP instructions perform no operation and are generally used as filler or instruction place-holders. For example, NOP operations have an immediate operand that is not used. These operand fields provide an efficient one-way communication channel between the compiler and hardware or software.

Because the compiler stores the dead register information in the unused operand area, the analysis information can be accessed without making the low-level code larger. Should the low-level code not have a NOP instruction to encode register utilization information, the dynamic optimizer or other software can examine the operands of NOPs instructions in the surrounding basic blocks to deduce the missing information. A basic block is a collection of a sequence of instructions that are entered at the top of the sequence and exited at the bottom of the sequence.

An advantage of deducing this missing information is that the information is particularly useful in improving performance of dynamic optimizations performed at runtime. This is because the analysis overhead directly reduces performance when performed. In the preferred method of the present invention, because the dynamic optimizations may inspect the unused NOP operands very quickly, the overhead is dramatically reduced to improve runtime performance.

In another embodiment, the compiler may pass hints to profiler software of what kind of feedback information is desired through the use of the unused NOP operands. Because of many other possible uses of this communication channel, the compiler has to annotate the low-level code binaries it produces to indicate what information is contained in the unused NOP operands.

BRIEF DESCRIPTION OF THE DRAWINGS

The accompanying drawings incorporated in and forming a part of the specification illustrate several aspects of the present invention, and together with the description, serve to explain the principles of the invention. In the drawings.

DETAILED DESCRIPTION OF THE PREFERRED EMBODIMENT

Reference will now be made in detail to the description of the invention as illustrated in the drawings. Although the invention will be described in connection with these drawings, there is no intent to limit it to the embodiment or embodiments disclosed therein. On the contrary, the intent is to include all alternatives, modifications, and equivalents included within the scope of the invention as defined by the appended claims.

Figure 1:
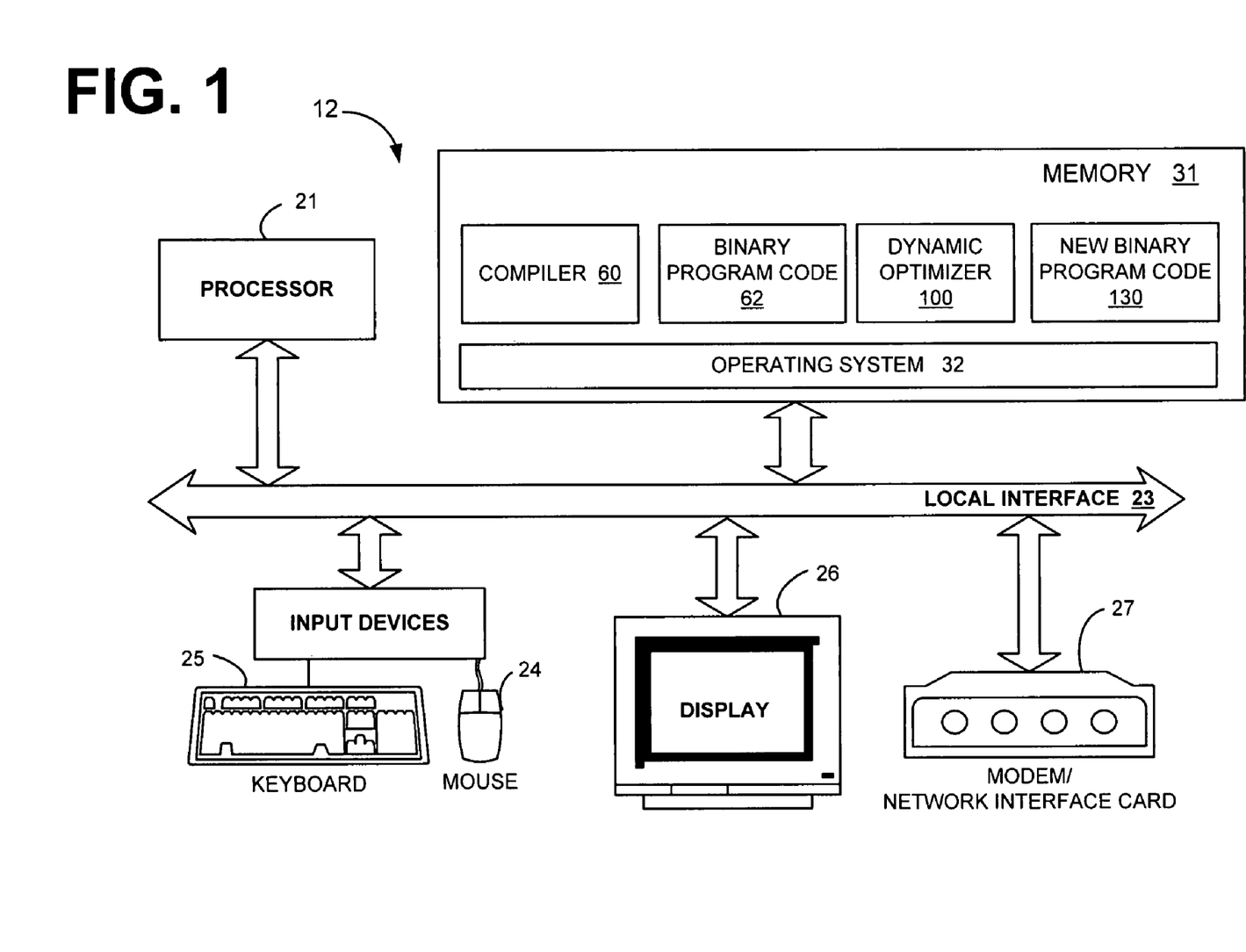
FIG. 1 is a block diagram of a user system showing the compiler and dynamic optimizer of the present invention within the memory area.

As illustrated in FIG. 1A, computer system 12 today generally comprises a processor 21 and memory 31 (e.g., RAM, ROM, hard disk, CD-ROM, etc.) including an operating system 32. The processor 21 accepts binary program code 62 and data from the memory 31 over the local interface 23, for example, a bus(es). Direction from the user can be signaled by using input devices, for example but not limited to, a mouse 24 and a keyboard 25. The actions input and result output are displayed on the display terminal 26.

Also shown is the compiler 60, binary program code 62, translated binary program code 130 and dynamic optimizer 100 in memory area 31. These components and their operation are herein described in further detail with regard to FIGS. 4–9.

Figure 2A:
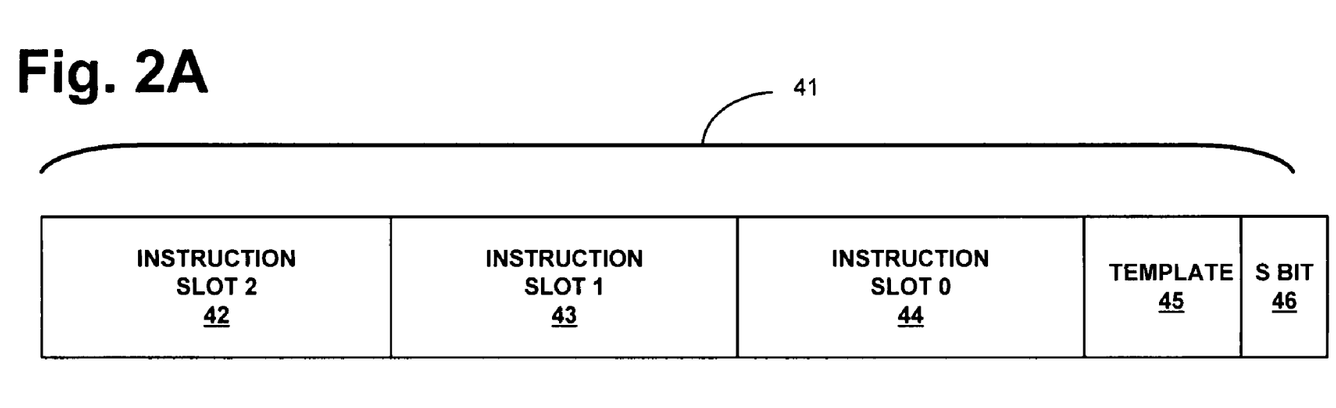
FIG. 2A is a block diagram of a possible example of a bundled instruction, having three instructions grouped together in an X bit sized and aligned container.

Illustrated in FIG. 2A is a block diagram of an example of three instructions that are grouped together in an X-bit sized and aligned container called a bundle 41. Each bundle 41 contains three Y-bit instruction slots 42–44, a Z-bit template 45 and a stop bit fields. The stop bit field 46 specifies whether the instruction group boundary occurs after the last instruction of the current bundle 41. Each of the instruction slots 42–44 includes an op code and necessary operands to execute one instruction. The template 45 specifies two properties: the instruction group boundaries within the current bundle 41, and the mapping of the instruction slots to execution unit types. Within a bundle 41, execution order proceeds from slot 0 to slot 2.

The inventors have described an example of a specific instruction bundle format. However, the inventors contemplate that the present invention can be applied to system architectures that do not bundle instructions or bundle instructions in a different way from that disclosed above.

Figure 2B:
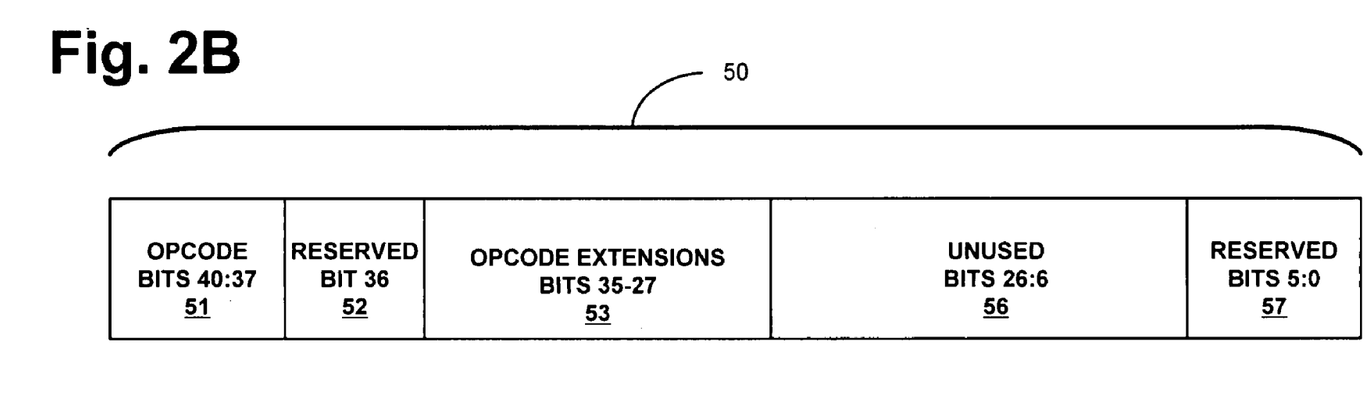
FIG. 2B is a block diagram of a possible example of a NOP instruction.

Illustrated in FIG. 2B is an example of a possible instruction format for NOP instruction 50. As illustrated, the opcode bits 51 occupy bits 40 through 37 of the possible NOP instruction. A reserved bit 52 occupies bit 36 of the possible instruction format for NOP instruction 50. Opcode extensions 53 occupy bits 35 through 27 of a possible instruction format for a NOP instruction 50. Unused bits 56 occupy bits 26 through 6 of a possible instruction format for NOP instruction 50. This is where the register usage bit vector of the present invention is stored. Bits 5 through 0 are reserved bits 57. The inventors further contemplate that the present invention can be utilized with any system architecture, as long as there are unused bits in a NOP instruction 50, regardless of the particular instruction format.

Figure 3A:
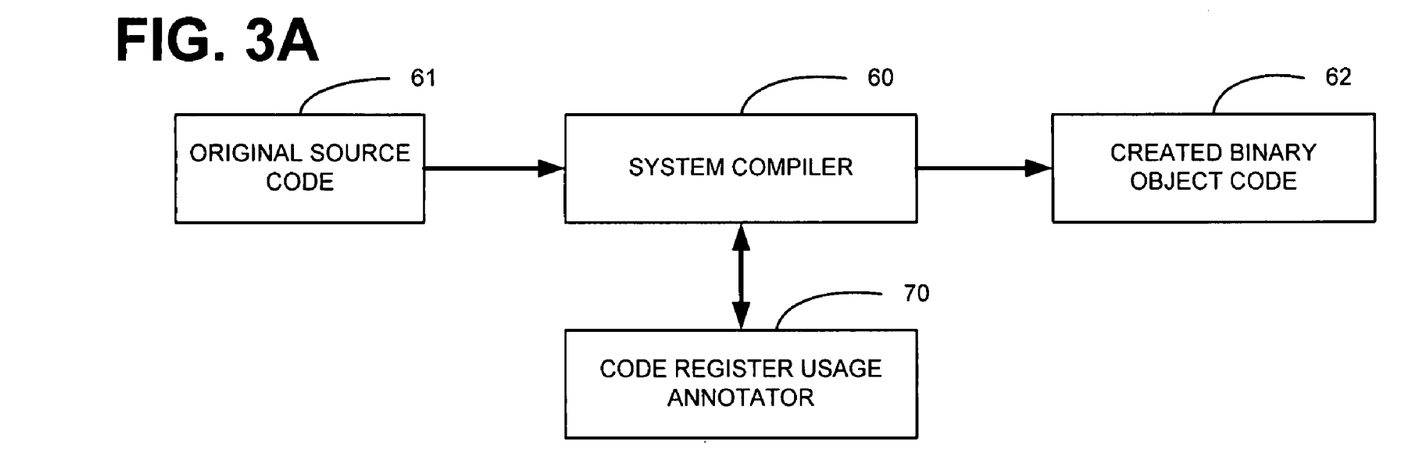
FIG. 3A is a block diagram of the system of the present invention showing the interaction between the code register usage annotator and the system compiler to create a binary program code from the original source code.

Illustrated in FIG. 3A is a block diagram showing the interaction of the code register usage annotator 70, for the system compiler 60, and the created binary object code 62 of the present invention. The original source code 61 is input into the system compiler 60 of the present invention.

The system compiler 60 of the present invention includes the improvement that interacts with the code register usage annotator 70, for bit vector generation. This is done to assist the dynamic optimizer 100 in the creation of the new optimized binary object code 130. The system compilation process 60 is herein defined in further detail with regard to FIG. 4.

The code register usage annotator 70 generates bit vector annotation for each NOP instruction in the binary code based on register allocation results of the system compiler 60. The code register usage annotator 70 is herein defined in further detail with regard to FIG. 5.

Figure 3B:
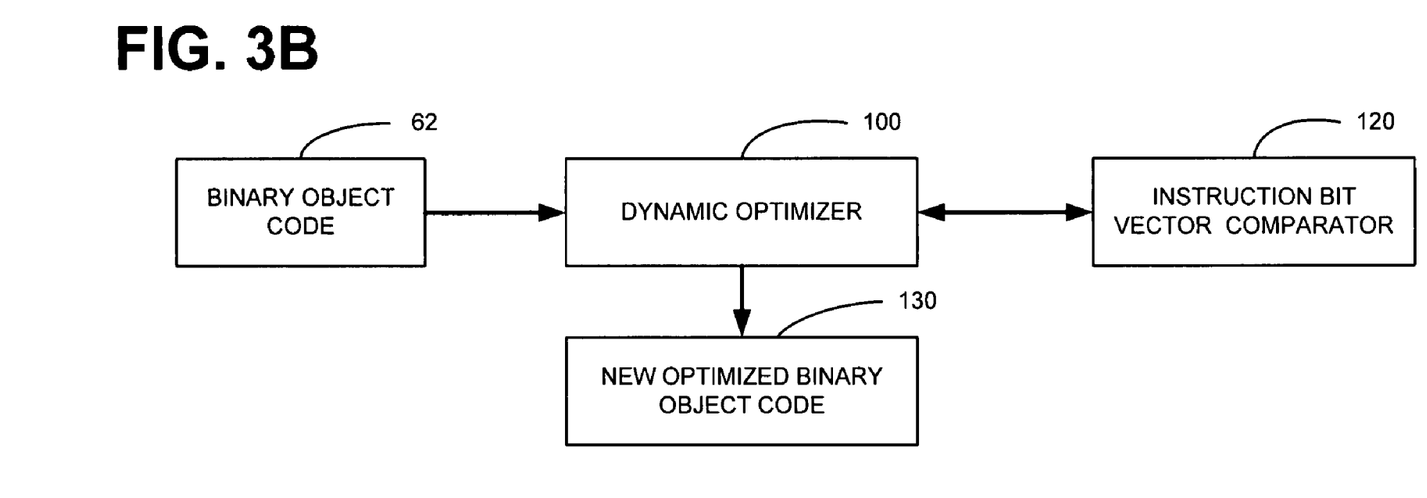
FIG. 3B is a block diagram of the system of the present invention showing the interaction between the binary program code, the dynamic optimizer, and the instruction vector comparator to create new optimized binary program code.

Illustrated in FIG. 3B is a block diagram illustrating the dynamic optimizer process of the present invention. As illustrated in FIG. 3B, the binary object code 62 generated by the system compiler 60 of the present invention is input into the dynamic optimizer 100 of the present invention.

The dynamic optimizer 100 interacts with the instruction bit vector comparator 120 for each NOP instruction in each basic block to generate the newly optimized binary object code 130. The instruction bit vector comparator 120 utilizes the bit vectors created in NOP instructions in each basic block by the code register usage annotator 70 process. The dynamic optimizer process illustrated in FIG. 3B is herein defined in further detail with regard to FIGS. 7 and 8.

Figure 4:
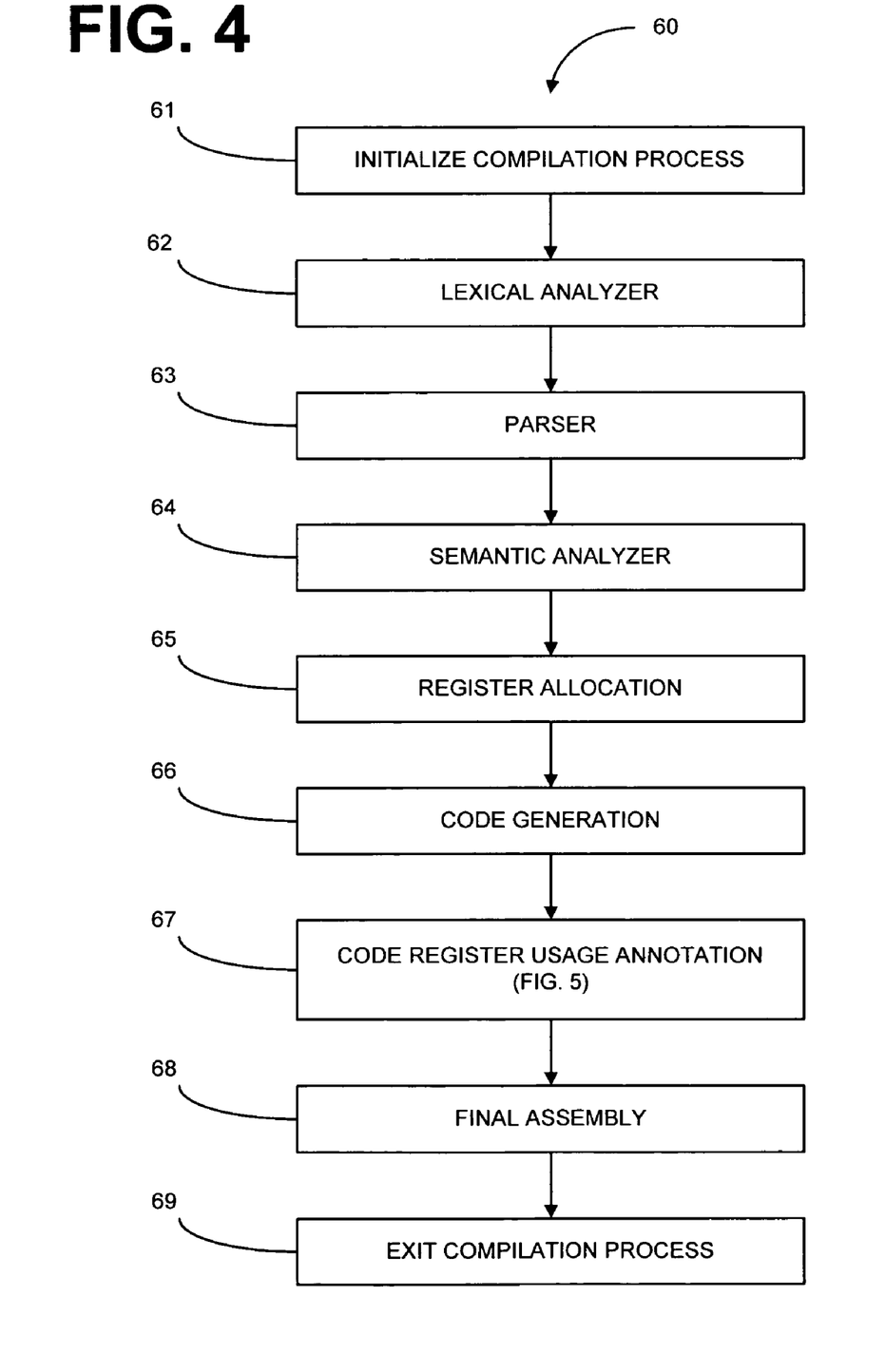
FIG. 4 is a flow chart of the preferred method to perform the compilation process, as shown in FIG. 1 and utilizing a possible example of NOP instructions.

Illustrated in FIG. 4 is the compilation process 60 of the present invention. First, the compilation process is initialized at step 61. Next, the compilation process 60 performs a lexical analyzer at step 62. Then, a parser is executed at step 63. The parser is a process that processes the sequence of tokens and produces an intermediate level representation, such as a parse tree or sequential intermediate code and symbol table, that records the identifiers used in the program and/or attributes. The parser may produce error messages if the token strings contain syntax errors.

The semantic analyzer operation is performed at step 64. The semantic analyzer is for checking a program for validity. This process takes the input of the intermediate code generated in the parsing step 63 and a symbol table, and determines whether the program satisfies the schematic properties required by the source language, i.e., where the identifiers are consistently declared and used. The semantic analyzer step 64 may produce an error message if the program is semantically inconsistent or fails in some other way to satisfy the requirements of the programming language definitions.

The register allocations are then performed at step 65. Then, the compilation process 60 performs the code generation process at step 66. Code generation utilizes the intermediate code generated in the parser step 63 and semantic analyzer step 64 and transforms the code into equivalent machine code in a form of a relocatable object module or directly executable object code. Any detected errors may be warnings or definite errors and in the later case may terminate the compilation.

Then, the code register usage annotation process of the present invention is performed at step 67. The code register usage annotation process is herein defined in further detail with regard to FIG. 5.

Next, the compilation process performs the final assembly process at step 68. However, this step is optional since many compilers generate binary machine codes without requiring an assembly output. The compilation process 60 is then exited at step 69.

An alternative approach involves the code register usage annotation step 67. It is contemplated by the inventors that the compilation process 60 can inherit the register allocation information generated at step 65 and use this information since the compiler has determined what registers have been used and where the registers are used already. In this way, the compiler process 60 would not need to again scan the code to determine the register usage, as shown in FIG. 5.

Figure 5:
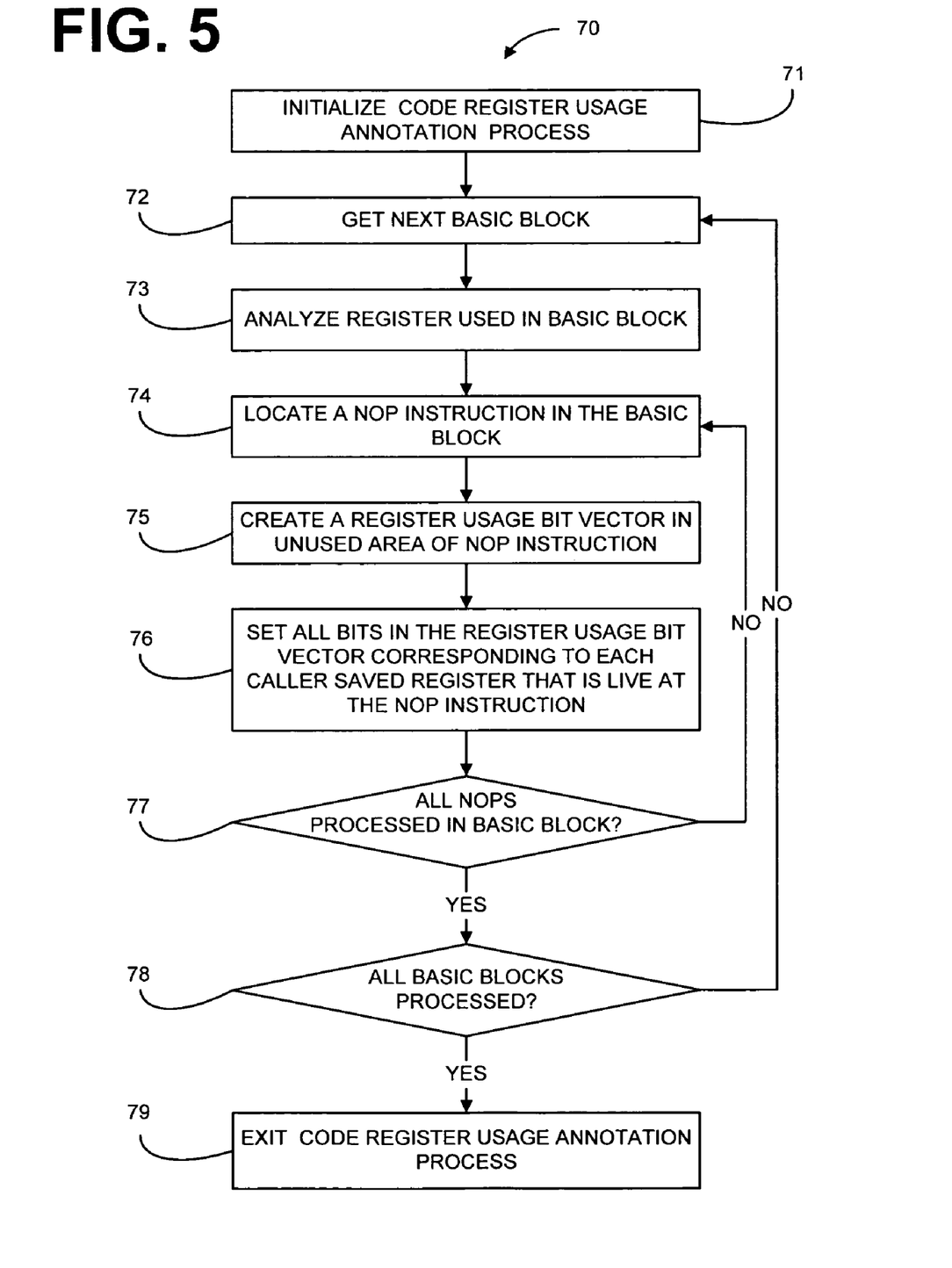
FIG. 5 is a flow chart of an example of the preferred method to perform the code register usage annotation process, as shown in FIG. 3A.

Illustrated in FIG. 5 is a flow chart of the process for determining the code register usage annotation 70. The code register usage annotation process 70 is first initialized at step 71. The code register usage annotation process 70 then gets the next basic block (i.e., subroutine, function, or procedure) for analysis at step 72. The code register usage annotation process 70 determines the registers used in each basic block at step 73.

Next, the code register usage annotation process 70 locates a NOP instruction in the basic block at step 74. At step 75, the code register usage annotation process 70 creates a register usage bit vector 80 in the unused area of the NOP instruction located at step 74. The code register usage annotation process 70 sets all the bits in the NOP instruction register usage bit vector 80 corresponding to each caller-save register that is live at the location of the NOP instruction in the basic block at step 76. Liveness of a register occurs when the register contains data that is to be utilized in subsequent processing. A register can switch between active usage of storing a value (live) for later consumption, and an inactive state (dead).

At step 77, the code register usage annotation process 70 determines whether all NOP instructions in the basic block have been processed. If all NOP instructions in the basic block have not been processed at step 77, the code register usage annotation process 70 then returns to repeat step 74 through 77.

If the code register usage annotation process 70 has processed all NOP instructions in the basic block, the code register usage annotation process then in step 78, determines whether all the basic blocks have been processed for NOP instructions. If the code register usage annotation process 70 determine that all the basic blocks have not been processed, the code register usage annotation process 70 returns to repeat step 72 through 78. If the code register usage annotation process 70 has processed all NOP instructions of all the basic blocks in the original source program 34 (FIG. 3A), the code register usage annotation process 70 exits at step 79.

Figure 6:
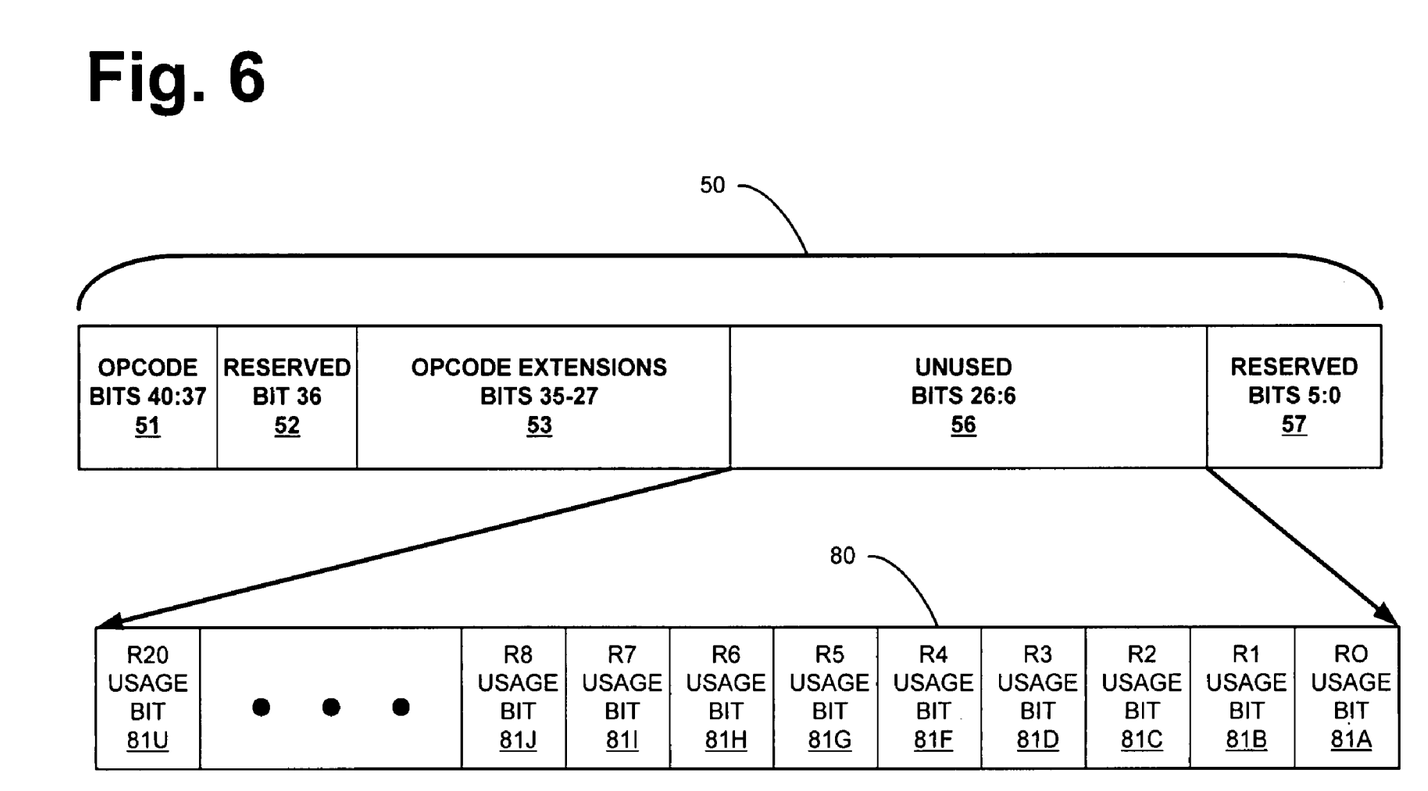
FIG. 6 is a block diagram showing the bit vector generated for each basic block of the present invention utilizing a possible example of NOP instructions as shown in FIG. 2B.

Illustrated in FIG. 6 is a block diagram representing an example of the structure of the code register bit vector 80 contained within the example of a NOP instruction's unused bit 56 ranging from 26 to 6. A total of 21 register usage bits of the example NOP instruction are available for register usage indication. The register usage bit vector 80 comprises a plurality of register usage bits 81A through 81U. Each caller saved register has a corresponding usage bit within the register usage bit vector 80 contained within the NOP instruction's unused bits 56 ranging from 26 to 6.

Figure 7:
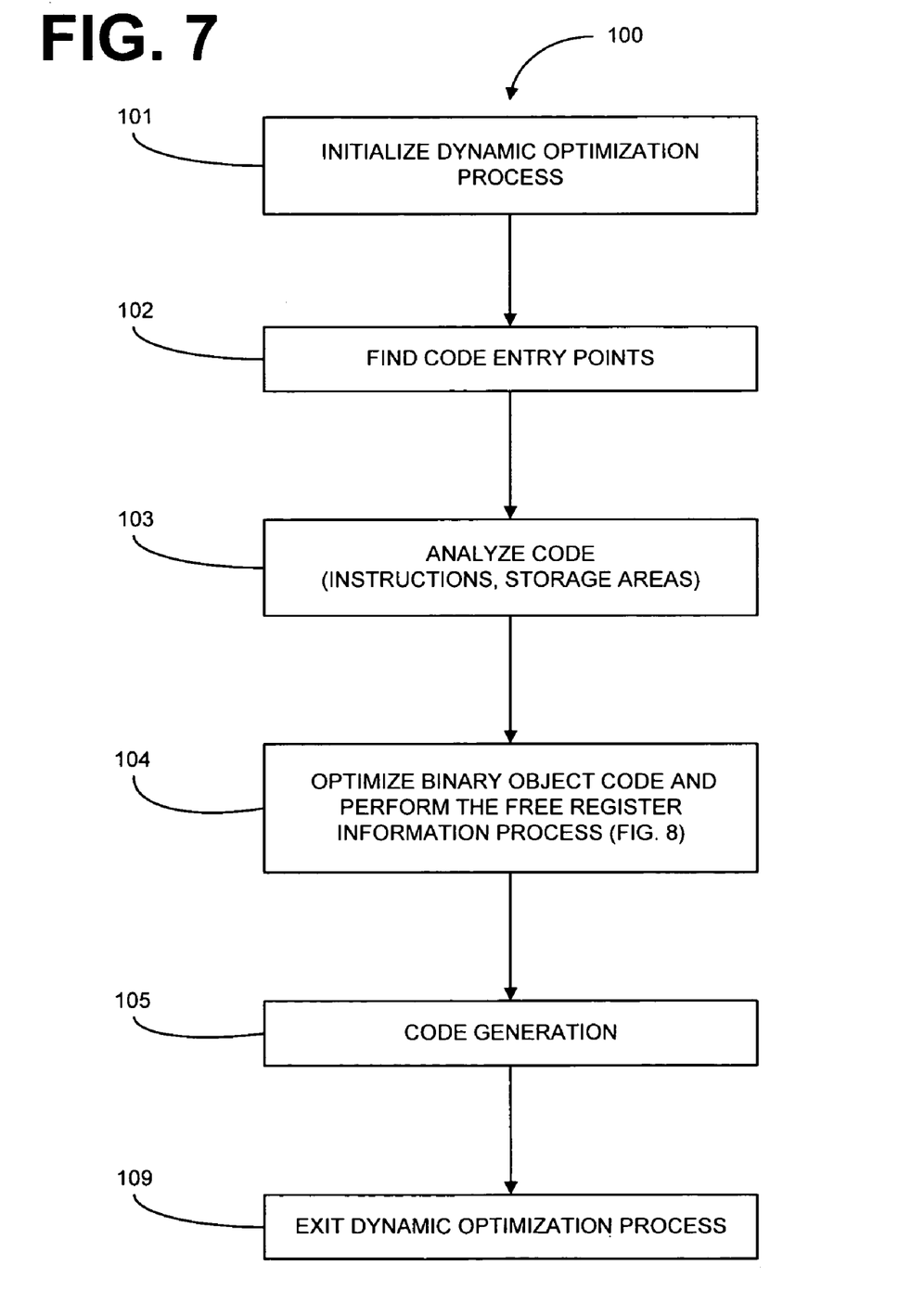
FIG. 7 is a flow chart of the preferred method to perform the dynamic optimization process of the present invention that utilizes the bit vectors to indicate register usage.

Illustrated in FIG. 7 is a flow chart of the dynamic optimizer process 100 of the present invention. First, the dynamic optimizer process 100 is initialized at step 101. The initialization process 100 determines or finds all the source code entry points at step 102. The dynamic optimizer process 100 analyzes the binary object code 62 from each entry point as determined in step 102, to ascertain all the instructions and storage areas, including registers and memory locations utilized by the binary object code 62.

At step 104, the dynamic optimizer process 100 performs the free register information process 110. The free register information process 110 is herein defined in further detail with regard to FIG. 8. After the free register information process 110 has been performed, the dynamic optimizer process 100 translates the created binary object code 62 into the new optimized binary object code 130 at step 105. The dynamic optimizer process then exits at step 109.

Figure 8:
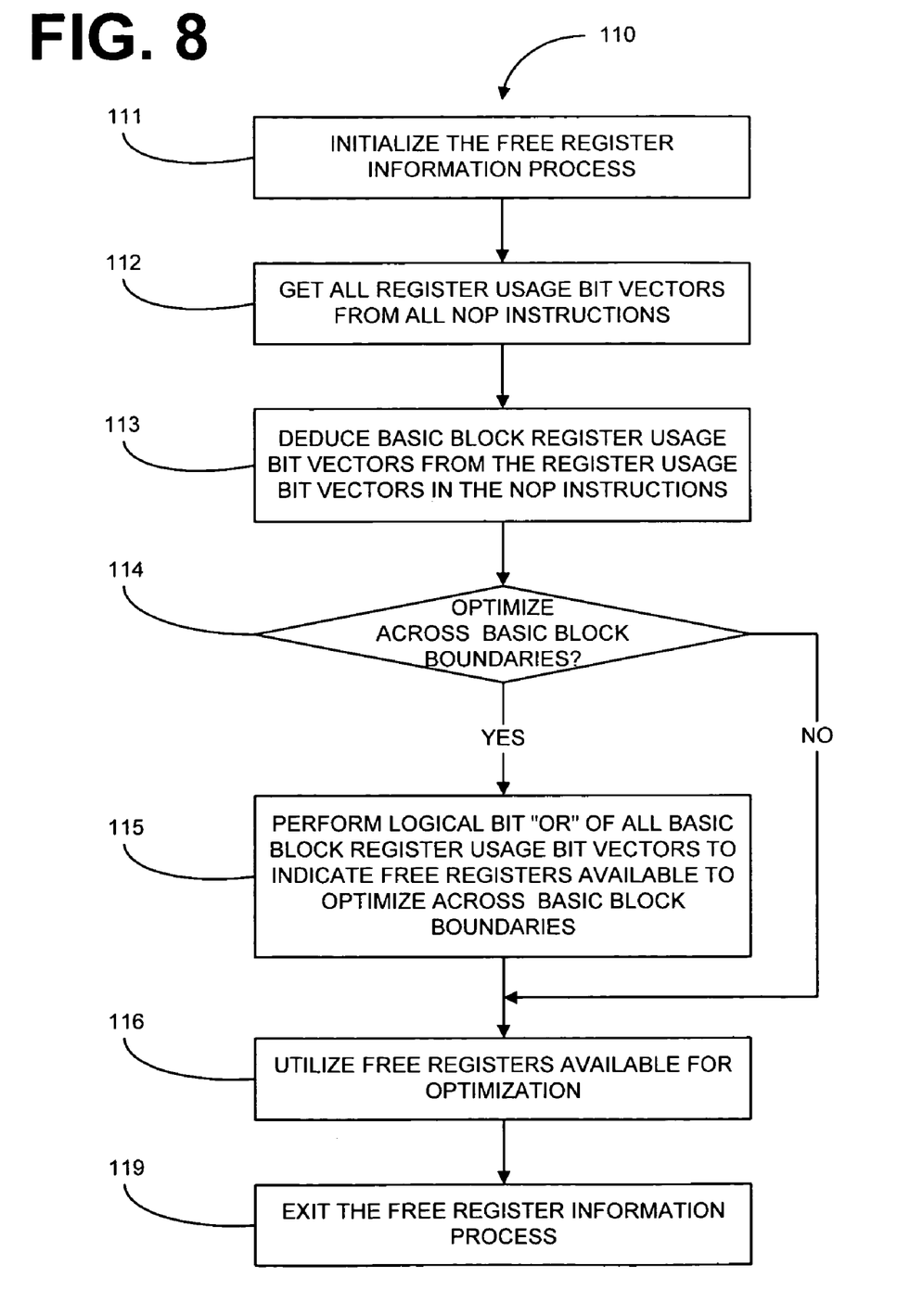
FIG. 8 is a flow chart of the preferred method to perform the free register information process of the present invention that utilizes the bit vector to indicate register usage.

Illustrated in FIG. 8 is the flow chart for the free register information process 110. The free register information process 110 is first initialized at step 111. The free register information process 110 retrieves all register usage bit vectors 80 in the affected NOP instructions, from all basic blocks within the binary object code 62 at step 112. For each NOP instruction, the register usage bit vector 80 indicates the register usage at the location of the NOP instruction containing the register usage bit vector 80. The register usage bit vector 80 of the basic block containing the NOP instruction is deduced from the register usage bit vector 80, at step 113. A basic block is a collection of a sequence of instructions that are entered at the top of the sequence and exited at the bottom of the sequence.

At step 114, the free register information process 110 determines if optimization is to be performed across basic block boundaries. If so, the free register information process 110 performs the bit-OR operation on the register usage bit vectors 80 of the affected basic blocks. This is done to determine which of the registers are not in use in any of the basic blocks. The free register information process 110 utilizes the register usage bit vectors 80 of the affected basic block instructions to optimize the binary object code 62 across basic block boundaries on-demand at step 115. Step 115 is not performed unless an optimization involves more than one basic block, and then only needs to logically "OR" the register usage bit vectors 80 of the basic blocks involved in one optimization.

If the free register information process 110 determines at step 114 that it is not configured to optimize across basic block boundaries, the free register information process 110 proceeds to step 116 to utilize the free registers available for optimization. After utilizing the free registers available for optimization, the free register information process 110 exits at step 119.

Figure 9:
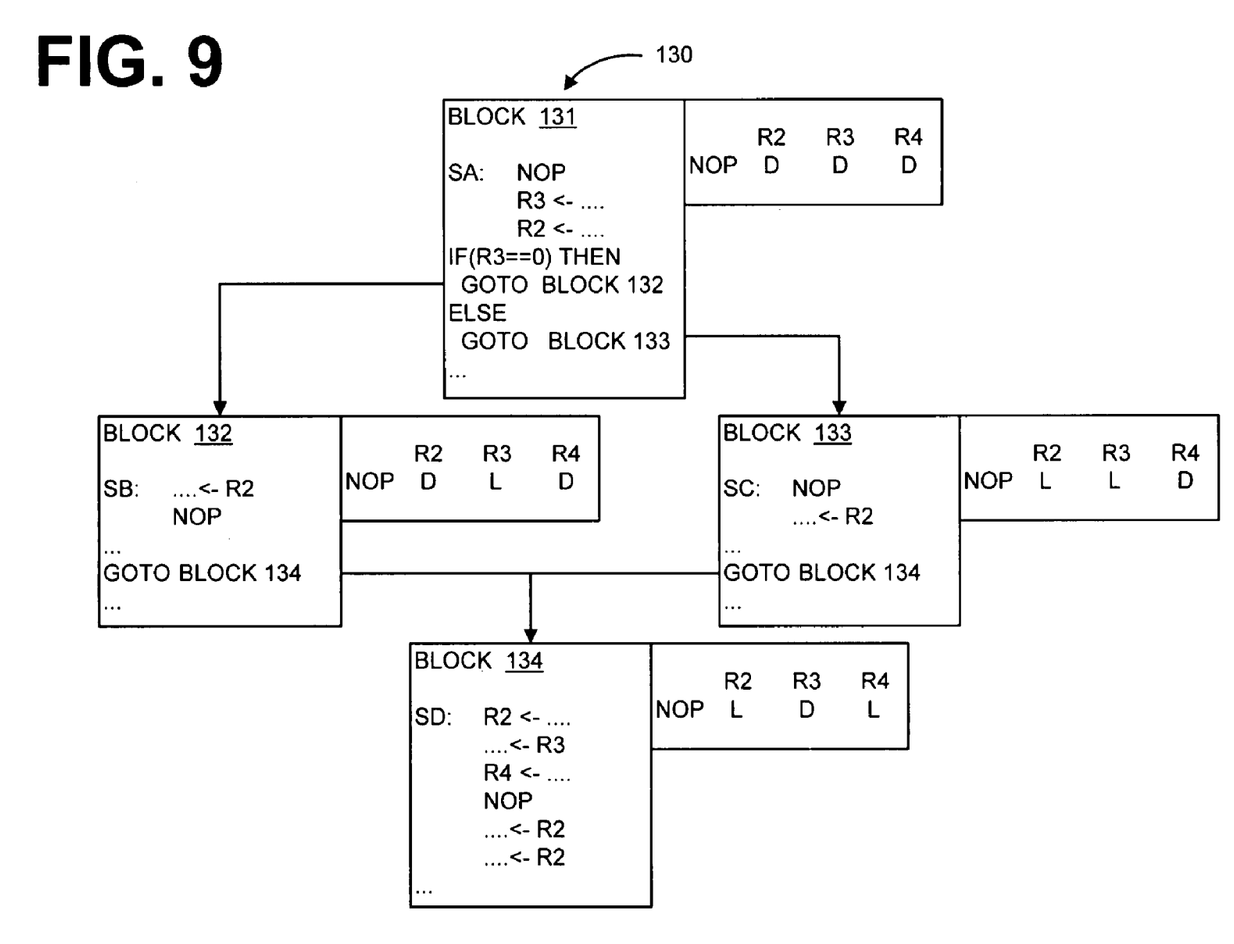
FIG. 9 is a block diagram of a possible example 130 of utilization of the present invention with regard to multiple basic blocks and multiple registers.

Illustrated in FIG. 9 is a block diagram of a possible example 130 of the utilization of the present invention with regard to 4 basic blocks (131–134) and the register usage of registers R2, R3 and R4. As shown in basic block 131, a NOP instruction is encountered and encoded prior to the loading of any registers. Therefore, the NOP instruction is encoded in the register usage bit vector 80 to reflect that all registers are dead. Basic block 131 contains code that loads data into registers R2 and R3 and then jumps to basic block 132 or basic block 133 for further processing.

Basic block 132 contains code that utilizes register R2 and causes register R2 to change status from live to dead. The NOP instruction in basic block 132 is encoded to reflect that registers R2 and R4 are dead, and that register R3 is live. This indicates that the contents of register R2 were consumed.

As shown in basic block 133, a NOP instruction is encountered and encoded prior to the processing of any registers. The NOP instruction in basic block 133 is encoded to reflect that registers R2 and R3 are live and that register R4 is dead.

Basic block 134 contains code that loads registers R2 and R4 and causes a change of state for registers R2 and R4 from dead to live. Basic block 134 further contains code that utilizes data in register is R3. The NOP instruction in basic block 134 is encoded to reflect that R2 and R4 are live, and that R3 is dead.

The optimization using unused operands in the NOP instruction system comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber is (optical), and a portable compact disc read-only memory (CDROM) (optical).

Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

The foregoing description has been presented for purposes of illustration and description. It is not intended to be exhaustive or to limit the invention to the precise forms disclosed. Obvious modifications or variations are possible in light of the above teachings. The flow charts of the present invention show the architecture, functionality, and operation of a possible implementation of the register usage optimization compilation and translation system. In this regard, each block represents a module, segment, or portion of code, which comprises one or more executable instructions for implementing the specified logical function(s). It should also be noted that in some alternative implementations, the functions noted in the blocks may occur out of the order noted in the figures, or for example, may in fact be executed substantially concurrently or in the reverse order, depending upon the functionality involved.

The embodiment or embodiments discussed were chosen and described to provide the best illustration of the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A computer system including a processor configured to execute the compiler comprising:
   a compiler configured to compile blocks of code, to find unused bits in a NOP instruction in one of the blocks of code, and to encode information as a bit vector in the unused bits, wherein the information identifies whether certain registers in said one of the blocks of code are live; and
   a dynamic optimizer that is configured to optimize the compiled blocks of code, wherein a configuration of the optimized and compiled blocks of code is responsive to the information.

2. The computer system of claim 1, further comprising:
   a register usage comparator configured to identify live registers responsive to the information.

3. A method comprising:
   compiling blocks of code, including finding unused bits in a NOP instruction in one of the blocks of code, and encoding information as a bit vector in the unused bits, wherein the information identifies whether certain registers in said one of the blocks of code are live; and
   optimizing the compiled blocks of code, wherein a configuration of the optimized and compiled blocks of code is responsive to the information.

4. The method of claim 3, further comprising:
   identifying live registers responsive to the information.

5. The method of claim 3, wherein the information is encoded without defining new instructions or opcodes.

\* \* \* \* \*

UNITED STATES PATENT AND TRADEMARK OFFICE
CERTIFICATE OF CORRECTION

PATENT NO. : 7,257,806 B1 Page 1 of 1
APPLICATION NO. : 09/422539
DATED : August 14, 2007
INVENTOR(S) : Ding-Kai Chen et al.

It is certified that error appears in the above-identified patent and that said Letters Patent is hereby corrected as shown below:

In column 7, line 25, after "register" delete "is".

In column 7, line 51, after "fiber" delete "is".

Signed and Sealed this

Eighth Day of July, 2008

JON W. DUDAS
*Director of the United States Patent and Trademark Office*